Oct. 20, 1953　　　W. E. MARTIN　　　2,656,195
INTERCHANGEABLE DUAL TRAILER COUPLING PIN
Filed July 15, 1948　　　3 Sheets-Sheet 1
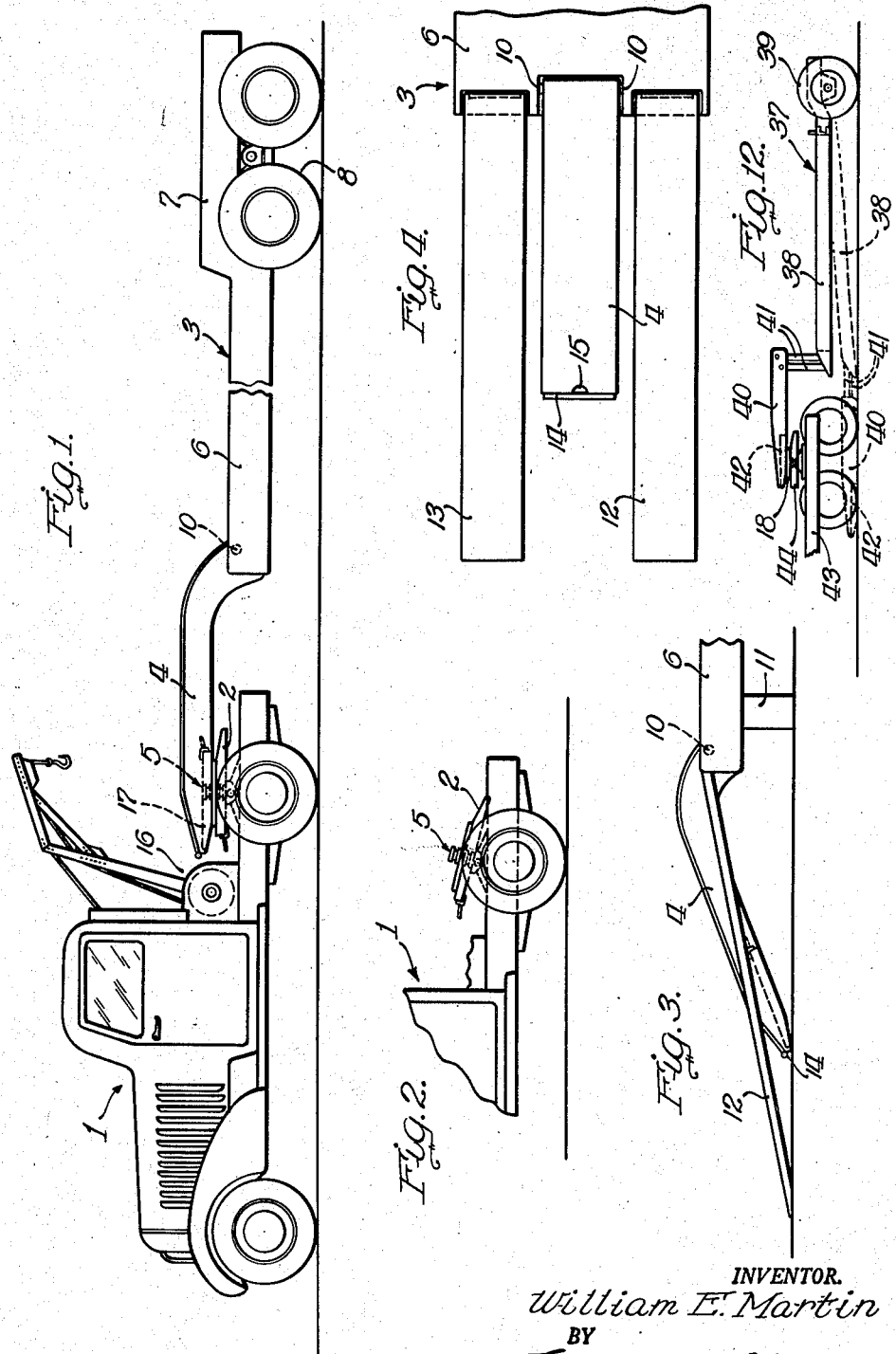
INVENTOR.
William E. Martin
BY
Eberhard E. Wettley
Atty.

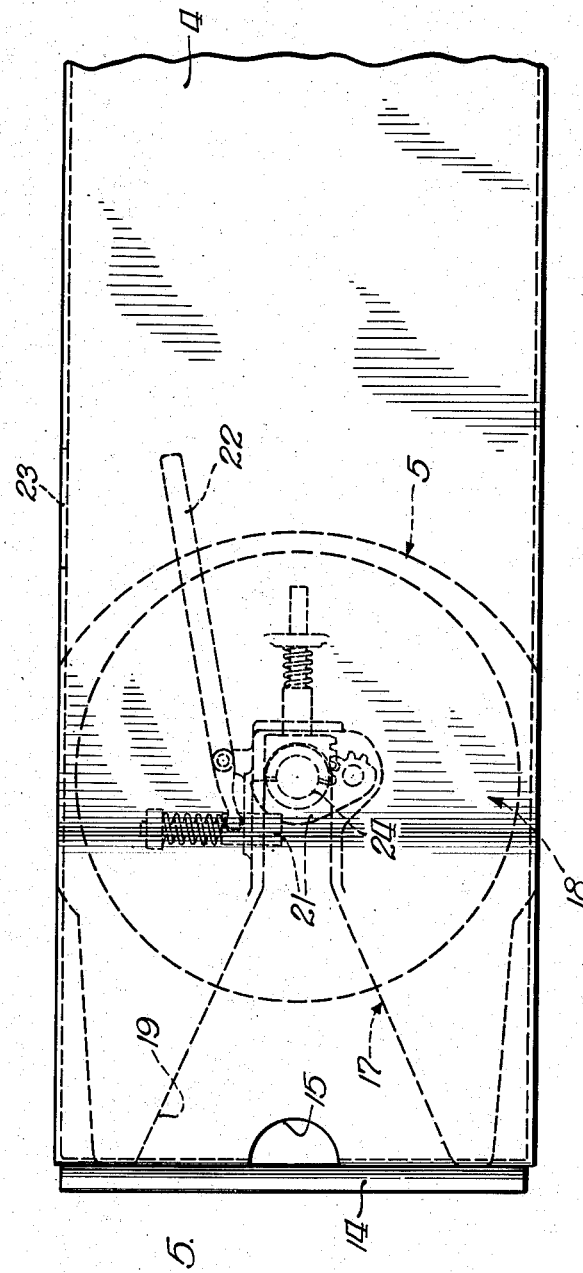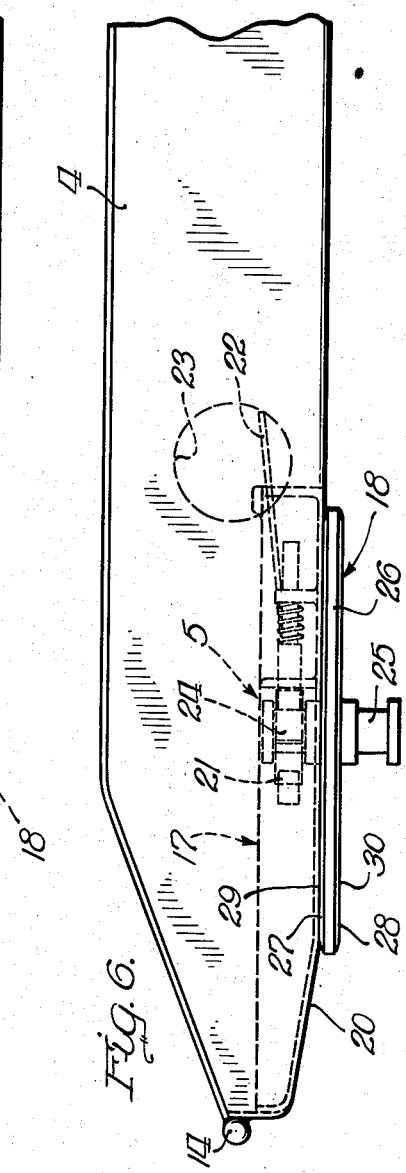

Oct. 20, 1953     W. E. MARTIN     2,656,195
INTERCHANGEABLE DUAL TRAILER COUPLING PIN
Filed July 15, 1948     3 Sheets-Sheet 3
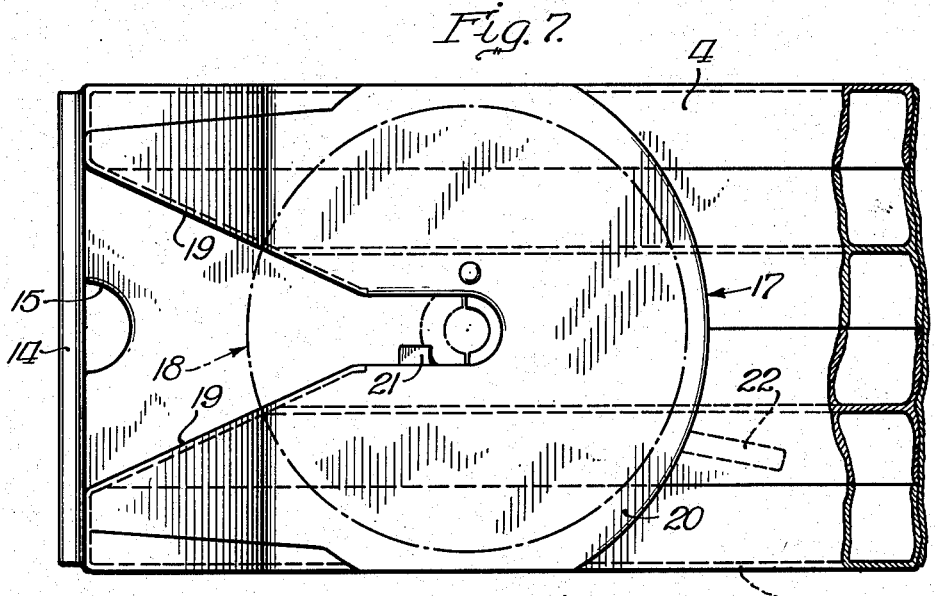
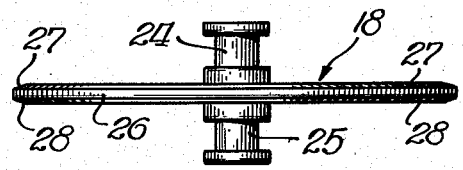
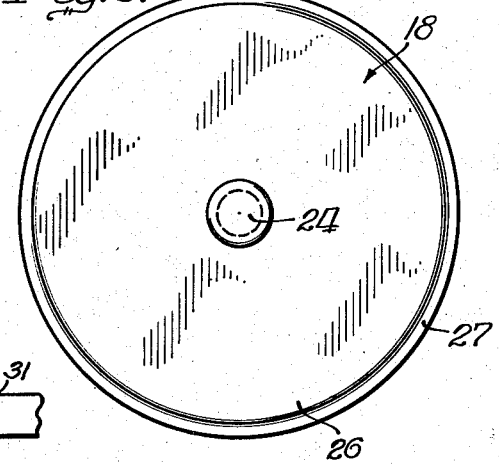
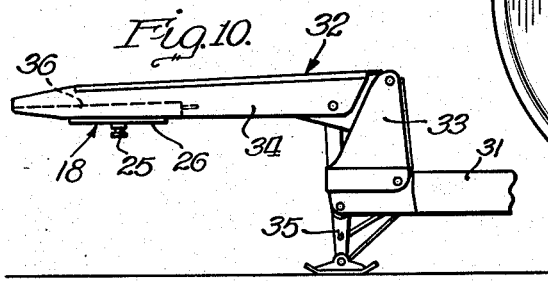
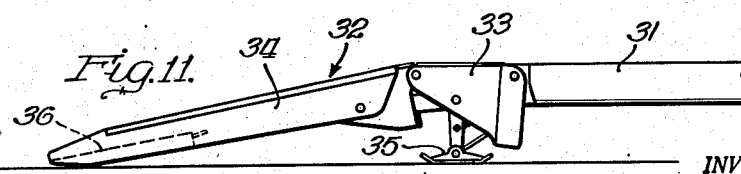
INVENTOR.
William E. Martin
BY
Eberhard E. Weltey
Atty.

Patented Oct. 20, 1953

2,656,195

UNITED STATES PATENT OFFICE 2,656,195

INTERCHANGEABLE DUAL TRAILER COUPLING PIN

William E. Martin, Kewanee, Ill.

Application July 15, 1948, Serial No. 38,837

7 Claims. (Cl. 280—33.05)

This invention relates to a tractor-trailer hitch arrangement including mechanism that is more specifically designed to provide a coupling means for use in combination with a trailer having a fixed hitch structure or to a trailer having a swingable hitch that can be lowered relatively to the trailer bed for the purpose of facilitating loading and unloading machinery from the hitching end of said trailer bed.

The present arrangement incorporates various features that may be used with equal utility and efficiency to provide a coupling between any two kinds of vehicles adapted for fifth wheel connection. However, the contemplated coupling arrangement is more particularly adapted for use with trailers that have a hitch which is capable of actuation into a reclining position in contact with the surface of the road or ground. With hitch means of the latter type, it is evident that the coupling pin or king pin of the hitch is subjected to much abuse through engagement with the roadway or ground. The coupling pin is either subjected to injury during the lowering of the hitch or else the pin picks up or accumulates dust, dirt, sand, gravel or various other foreign materials by reason of its position beneath the hitch and near to the end thereof.

On many occasions the hitch does not have the ability to fully contact the trailer supporting surface by reason of the pin which may rest upon or abut the aforesaid surface before the hitch or simultaneously therewith. It is obvious in situations where a pin is used in connection with a hitch which also serves as a ramp for the trailer, that other factors add to the abuse of the coupling pin under conditions of loading and unloading of the trailer. In the latter instances, some or all of the weight of the machinery crossing the ramp and the weight of the ramp may be supported by the pin or the latter may be driven deeper into the trailer supporting surface.

One of the main objects of the present invention is to provide a hitch with an interchangeable dual coupling pin that can be removed at will from the trailer hitch to avoid the aforementioned undesirable conditions, thus preserving the pin by preventing damage through use and by further preventing excessive contact of the pin with foreign materials that would be transmitted to the fifth wheel bearing parts by the greased pin under subsequent union of these parts leading to abnormal wear during towing under hauling operation.

Another object of the present invention is to provide a dual coupling pin or king pin which carries an annular disc bearing means that provides an intermediate bearing wafer for use between the trailer hitch and the fifth wheel mechanism of the tractor, and which wafer provides a cover for either the hitch while disposed in raised position when not in use, or which similarly provides a cover for the greased bearing plate of the tractor fifth wheel mechanism depending upon the choice of the person in charge and upon the conditions of operation at the time considered. Preferably the coupling pin assembly would be kept upon the supporting bearing plate of the fifth wheel of the tractor to permit freedom of operation of the trailer hitch minus such assembly, the latter then comprising cover means to protect the greased bearing plate of the tractor fifth wheel while the tractor is driven from place to place, or otherwise while not in use.

This invention further contemplates the use of an interchangeable dual coupling pin in combination with two fifth wheel assemblies, one of the assemblies comprising the conventional tractor fifth wheel, while the other assembly is embodied into the trailer hitch in inverted position and with the coupling or king pin approach slot of the hitch assembly disposed toward the outer free end of the hitch for reception of the coupling pin when carried by the tractor fifth wheel. The reverse situation is also readily accomplished when the coupling pin has been retained by the hitch fifth wheel or otherwise connected therewith to dispose such pin in its usual relation for operative coupling with the tractor fifth wheel as the latter is brought into contact with the pin through movement of the tractor.

Other objects and advantages relating to the design and construction of the interchangeable dual coupling pin of the present invention and relating to the combination of mechanisms used in connection with such pin shall hereinafter appear in the following detailed description thereof having reference to the accompanying drawings forming a part of this specification.

In the drawings:

Fig. 1 is a side elevational view of the tractor-trailer combination generally illustrating the application of the mechanism of this invention as a coupling means between the trailer hitch and the fifth wheel of the tractor;

Fig. 2 is a side elevational view of a fragmentary portion of the tractor with the trailer removed, but with the interchangeable dual coupling pin and its integral parts retained upon the fifth wheel of the tractor and providing a cover for the bearing plate of such fifth wheel;

Fig. 3 is a side elevational view of the forward end of the trailer as the latter would appear when loading or unloading the same, and with the hitch in declining position to facilitate such loading and unloading;

Fig. 4 is a plan view of the portion of the trailer shown in Fig. 3 illustrating the use of a narrow hitch and flanked by removable ramps connected with the trailer bed;

Fig. 5 is an enlarged plan view of a fragmentary portion of the trailer hitch to better illustrate the king pin receiving mechanism of the hitch and its relationship to the latter;

Fig. 6 is a side elevational view of the same end of the trailer hitch shown in Fig. 5 and illustrating further details of construction of the coupling means;

Fig. 7 is an underneath view of the same portion of the trailer hitch illustrated in Figs. 5 and 6, but omitting the dual coupling pin for the sake of clarity;

Fig. 8 is an edge elevational view of the interchangeable dual coupling pin assembly per se;

Fig. 9 is a plan view of the pin assembly;

Fig. 10 is a fragmentary side elevational view of the forward portion of another type of trailer wherein the hitch is designed to provide a full trailer width ramp but with the same interchangeable dual coupling pin arrangement incorporated therein to serve the same purpose as in the narrow hitch tongue illustrated in Figs. 1, 3 and 4;

Fig. 11 is a fragmentary side elevational view of the trailer in Fig. 10 but with the coupling pin assembly removed and with the hitch folded into loading position as a ramp declining and in engagement with the ground; and Fig. 12 is a side elevational view of another kind of trailer having a collapsible hitch utilizing the dual coupling pin of the present invention to enhance the efficiency of operation of the trailer hitch and to eliminate any interference with the freedom of operation of a hitch of this kind.

The general environment of this invention is best pictured in Fig. 1 showing a conventional tractor 1 or other pulling vehicle equipped with a conventional type of fifth wheel 2 arranged for towing a trailer 3 by means of the hitch 4 through the instrumentality of the coupling means 5 of the present invention. The trailer 3 briefly includes a machinery hauling bed 6 upwardly offset at the rear to form a wheel platform 7 adapted for supporting the rear end of the trailer upon the rear wheel carriage 8. The hitch 4 is suitably pivoted to the trailer bed 6 at 10 and is arranged for limited upward movement beyond the hauling position in Fig. 1 to support the front end of the trailer and to tow the same, such hitch 4 being capable of relative downward movement with respect to the bed 6 into a ground engaging position as shown in Fig. 3.

With this type trailer, it is customary to block up the front end of the bed 6 at 11 in Fig. 3 and to then depress the hitch 4 about its bed pivot 10 to provide clearance for loading or unloading the trailer. Trailer end ramps 12 and 13 are utilized for connection with bed 6 as seen in Figs. 3 and 4, such ramps flanking the hitch 4 and providing the approaches to the bed 6 of the trailer 3. The outer end of the hitch 4 is provided with a pick up bar 14 welded to the hitch, and a portion of the hitch is cut away at 15 to establish clearance for a cable hook operated by the winch 16 usually carried by the tractor 1 for the handling of the trailer and its connected hitch in the customary practice associated with this art.

Referring now to Figs. 5, 6 and 7, the coupling means 5 comprises a conventional fifth wheel 17 and the interchangeable dual coupling pin 18 carried by the fifth wheel 17 of the hitch 4 and adapted for coaction with the fifth wheel 2 of the tractor 1. The fifth wheel 17 is preferably a duplicate of the fifth wheel 2 but is embodied into the outer end of the hitch 4 in inverted position with its pin receiving slot 19 opening forwardly with respect to the trailer and outwardly of the trailer hitch 4. The fifth wheel 17 has its bearing plate 20 forming a coplanar part of the under surface of the hitch 4, and suitable pin latching mechanism 21 is used to retain or release the coupling or king pin as in conventional forms of fifth wheels, and a release lever 22 provides hand actuating means to release the latching mechanism 21. The latching function is usually an automatic operation. Since lever 22 and its associated mechanisms are disposed within the structure of the hitch 4, suitable openings such as 23 can be provided for access and for manual operation of lever 22 to release the pin through the release of the latching mechanism 21.

The coupling pin assembly 18 is best shown in Figs. 8 and 9 and comprises dual coupling pins 24 and 25 projecting co-axially from either side of an annular disc 26 providing a bearing wafer for dual contact with the respective bearing surfaces of the fifth wheels 2 and 17. The peripheral edges of the disc 26 are rounded or beveled at 27 and 28 to prevent excessive friction or cutting of the bearing plate surfaces of the fifth wheels 2 or 17 whichever happens to be approaching the dual pin assembly during coupling operation.

The dual pin assembly 18 is therefore a unitary floating coupling member which by selection may be kept latched to either of the fifth wheel mechanisms 2 or 17, or the assembly can be simultaneously latched to each fifth wheel as during the hauling operation shown in Fig. 1, or the assembly 18 may be removed entirely if conditions of operation warrant such removal. Obviously, the reversal of the disc, top for bottom, will make no difference since the pins 24 and 25 are alike and the disc 26 is disposed in a median plane between such pins, which plane is also at right angles to the common axis of both pins.

Although the coupling pin assembly 18 does permit several choices of use as well as selective disposition as explained, it will be preferable to use such assembly to fit the occasion and in its normal designed capacity to fully make the best of the inherent features thereof. Inasmuch as the union of the pin assembly 18 with the two superimposed fifth wheels 2 and 17 of the two vehicles 1 and 3 does not necessarily require the use of two supporting and juxtaposed bearing surfaces surrounding the coaxial pins 24 and 25, it is contemplated that the bearing plate 20 of the upper fifth wheel 17 of the hitch 4 and the adjacent upper face 29 of the wafer or disc 26 in Fig. 6, shall remain free of grease or other lubricant, while the lower face 30 of disc 26 in Fig. 6 may be greased for coaction with the bearing plate of the fifth wheel 2 of the tractor 1. With this arrangement, substantially all if not the entire relative rotational movement between the hitch 4 and fifth wheel 2 shall be confined to the lower face 30 of disc 26 and the upper bearing surface of the fifth wheel 2, which surface is usually well greased for this purpose. The contacting adjacent surfaces at 29 of the disc and fifth wheel 17 will be subjected to very little if any relative movement due to the dry frictional contact of the abutting members described under the pressure of the weight of the trailer 3 through its hitch 4.

Since the upper bearing surface of the fifth wheel 2 of the tractor 1 is usually full of grease or other lubricant, it is contemplated to retain the coupling pin assembly with such fifth wheel upon separation of the vehicles as illustrated in Fig. 2. This will take the pin assembly away from the movable hitch 4 of the trailer 3 to safeguard the pins from injury and from ground contact, and at the same time the disc 26 will provide a cover for the grease filled bearing plate of the tractor fifth wheel 2 to shield this grease covered surface from the accumulation of dirt, sand, gravel or the like which are always present at construction projects, or to prevent road dust, etc., from settling upon the fifth wheel bearing plate when the tractor is being transported from place to place.

Figs. 10 and 11 illustrate a heavier type of trailer having a bed 31 with an articulated hitch 32 composed of an intermediate section 33 and a ramp section 34, with both sections of full bed width, and including a retractible landing gear 35 to support this end of the trailer when the latter is disconnected from its towing vehicle. This construction utilizes an inverted fifth wheel 36 assembled into the hitch 32 much in the same manner as the fifth wheel 17 is incorporated into the hitch 4, and the dual coupling pin assembly 18 retains its same utility and mode of operation as hereinbefore described. By removing the pin assembly 18 with the tractor, the hitch 32 may be actuated into its declining position as in Fig. 11 for loading purposes without damaging the pin or without any interference by the pin under nonadequate clearance conditions.

Fig. 12 depicts another type of trailer 37 having a bed 38 supported upon a rear wheel carriage 39 and by means of a hitch 40 connected with the bed 38 through suitable parallelogram link mechanisms 41. In this trailer, the hitch 40 and link mechanisms 41 are narrow as in the trailer 3 construction of Figs. 1 and 4, and the hitch and forward portion of the trailer may be settled to the ground into the broken lined position by any suitable winch. In this type of a trailer the hitch 40 lies flat upon the road or ground during loading or unloading, and the incorporation of the dual coupling pin 18 of the present invention greatly enhances the operation and use of a trailer of this particular construction. The hitch is supplied with an inverted fifth wheel 42 for coaction with the dual pin means 18, and a tractor vehicle 43 carries a conventional fifth wheel 44 substantially duplicating the Fig. 1 arrangement as shown and described.

The fundamental structure of the invention is the same for all purposes as between a towing vehicle and a towed vehicle and permits of many variations of use as well as certain modifications in details of design. Since certain changes may be made in the device of this invention, it is intended that the matter contained in the aforesaid description or shown in the accompanying drawings shall be interpreted as illustrative only and not in a limiting sense.

What I claim is:

1. An interchangeable and bodily reversible dual coupling member for use in operatively connecting a pair of fifth wheels carried by two vehicles with one fifth wheel inverted with respect to the other and disposed in 180° relationship with respect thereto, comprising an independent and bodily reversible unit having a pair of identical hitch pins connected in coaxial relationship with the operative hitching ends of said pins disposed oppositely and outwardly, and an annular disc connected between said pins and positioned in a plane at right angles with respect to said pin axes, one of said hitch pins being adapted for releasable hitching connection with one of said fifth wheels, the other of said hitch pins being adapted for releasable hitching connection with the other of said fifth wheels, said annular disc and pins together comprising freely rotatable means interposed between said fifth wheels for movement relative to either, and said annular disc comprising stabilizing means sandwiched between both of said fifth wheels to counteract tilting of said pins under operative load hauling conditions.

2. An interchangeable dual coupling pin for releasable connection with a ground engaging tongue of a gooseneck trailer comprising a bearing plate, a pair of hitch pins secured to said plate and extending outwardly from opposite faces thereof and in axial alignment, said plate being of predetermined outline with the top and bottom peripheral edges thereof being beveled to counteract cutting of the hitching parts of the pin connected members, said pins being identically positioned at opposite sides of said plate and with respect to the median plane thereof, and either of said pins being adapted for operative hitching connection with said gooseneck trailer tongue and functioning to dispose the other of said pins in position for hitching connection with another vehicle, and said plate being adapted to rest upon the aforesaid fifth wheel and to form a cover therefor.

3. A hitch unit in combination with a folding ground contacting hitch of a flat bed trailer comprising a latching mechanism connected with said hitch, and a towing pin mechanism for said hitch comprising a first pin having latch parts releasably connectable with said latching mechanism, a bearing wafer for said pin in the form of an angular bearing member having portions thereof arranged to project radially outwardly with respect to the axis of said pin and into the area surrounding such pin to abuttingly engage said hitch adjacent said latching mechanism to position said first pin in a given relation with respect to said latching mechanism, and a second pin connected with said wafer for operative connection with a towing vehicle, said bearing wafer and pins together comprising freely rotatable means interposed between said trailer and towing vehicle for movement relative to either.

4. A hitch unit to connect two vehicles comprising a first latch mechanism carried by one vehicle adjacent an exposed surface thereon, a second latch mechanism carried by the other of said vehicles and adjacent an exposed surface thereon, and a self-contained axially rotatable and bodily reversible connecting hitch unit for joining said latch mechanisms and vehicles comprising a first towing pin having latch parts releasably connectable with either of said latch mechanisms, a bearing wafer connected with said first towing pin about the axis thereof and having one bearing surface thereon adapted for rotational surface engagement with one exposed surface of one of said vehicles and to position said first towing pin at a predetermined depth below said one surface to properly engage the latch mechanism adjacent that surface, and a second towing pin having connection with said bearing wafer for connection with the other of said latch mechanisms, said wafer having another bearing surface thereon arranged to rotatably engage the other of said exposed surfaces of said other vehicle to position said second pin for operative connection with said other latch mechanism of said other vehicle, said bearing wafer and pins together comprising freely rotatable means interposed between said vehicles for movement relative to either.

5. In a trailer, a hitch connected with said trailer for movement between towing position and ground contacting position, a coupling unit for towing said trailer connected with said hitch, said coupling unit comprising a fifth wheel connected in inverted position with said hitch with the fifth wheel bearing plate exposed beneath said hitch, and a hitch pin mechanism releasably attached to said inverted fifth wheel of said hitch, said hitch pin mechanism comprising a first pin connected with said inverted fifth wheel and a second hitch pin disposed in depending relation with respect to said inverted fifth wheel of said hitch, said second hitch pin comprising means for releasable connection with the fifth wheel of a tractor with said fifth wheel bearing plate of said tractor facing upwardly, and an annular plate member connected intermediate said pins to provide oppositely related bearing surfaces circumferentially positioned with respect to said pins, said plate member being adapted for sandwiching directly between the respective bearing plates of said fifth wheels, one bearing surface of said annular plate member being freely rotatable with respect to the bearing plate of said inverted fifth wheel, while the other bearing surface of said annular plate member is adapted for free supported rotation with respect to the bearing plate of the fifth wheel of the tractor, said annular plate member and pins together comprising freely rotatable means interposed between said fifth wheels for movement relative to either.

6. A dual coupling member to connect a pair of fifth wheels associated with a pair of vehicles with the fifth wheel of one vehicle being inverted in 180° relationship with respect to the fifth wheel of the other of said vehicles, said coupling member being bodily attachable to and removable from both of said vehicles and their fifth wheels and comprising a first hitch pin for one fifth wheel, a second hitch pin for the other fifth wheel, and a stabilizing bearing plate secured intermediate said hitch pins and circumferentially thereabout, said plate and pins comprising a structure rotatable independently with respect to both fifth wheels, said plate having one bearing surface thereon arranged to engage one fifth wheel for rotation relative thereto, and having the other bearing surface thereon arranged to engage the other of said fifth wheels for rotation relative thereto, said bearing plate and pins together comprising freely rotatable means interposed between said fifth wheels for moving relative thereto.

7. A hitch unit for connection with the pressure plate of the fifth wheel of a vehicle comprising a solid disc to cover and shield the pressure plate of said fifth wheel, the side of said disc contacting said pressure plate comprising a bearing surface adapted for relative rotation upon the pressure plate of said fifth wheel, aligned hitch pins connected with said solid disc and upon the opposite surfaces thereof with one of said pins comprising means to connect with said fifth wheel to position said disc in a given axial position with respect to said fifth wheel, said other hitch pin comprising means adapted for connection with a fifth wheel of another vehicle, the side of said disc disposed away from said adjacently connected pressure plate presenting a bearing surface for abutting and free rotational contact with the pressure plate of said other vehicle, and said disc comprising a freely supported radially reactive stabilizing means for said pins to brace said pins against cocking in any radial direction relative to said fifth wheel pressure plates during operating conditions and for any axially rotated position of said disc relative to either of said fifth wheels, said disc and pins together comprising freely rotatable means interposed between said fifth wheels for movement relative thereto.

WILLIAM E. MARTIN.

References Cited in the file of this patent

UNITED STATES PATENTS

| Number | Name | Date |
|---|---|---|
| 1,706,425 | Vested | Mar. 26, 1929 |
| 1,973,611 | Connors | Sept. 11, 1934 |
| 2,131,949 | Helmig | Oct. 4, 1938 |